United States Patent
Hitomi et al.

(10) Patent No.: US 10,546,017 B2
(45) Date of Patent: Jan. 28, 2020

(54) DISPLAYING TERMS HAVING CORRESPONDING CHARACTER STRINGS ON A DISPLAY

(71) Applicants: Keiichiro Hitomi, Kanagawa (JP); Kazuki Sasayama, Kanagawa (JP); Tatsuma Hirokawa, Kanagawa (JP); Zentaroh Ono, Tokyo (JP)

(72) Inventors: Keiichiro Hitomi, Kanagawa (JP); Kazuki Sasayama, Kanagawa (JP); Tatsuma Hirokawa, Kanagawa (JP); Zentaroh Ono, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/026,445

(22) Filed: Jul. 3, 2018

(65) Prior Publication Data
US 2019/0012402 A1    Jan. 10, 2019

(30) Foreign Application Priority Data
Jul. 6, 2017   (JP) .................. 2017-133151

(51) Int. Cl.
*G06F 15/80*   (2006.01)
*G06F 16/80*   (2019.01)
(Continued)

(52) U.S. Cl.
CPC ............. *G06F 16/80* (2019.01); *G06F 8/61* (2013.01); *G06F 8/65* (2013.01); *G06F 17/275* (2013.01)

(58) Field of Classification Search
CPC .......... G06F 16/80; G06F 17/275; G06F 8/61; G06F 8/65; G06F 9/454
See application file for complete search history.

(56) References Cited

U.S. PATENT DOCUMENTS 10,146,771 B2 * 12/2018 Okuda ................ G06F 17/2863
2013/0128313 A1    5/2013 Hirokawa et al.
(Continued)

FOREIGN PATENT DOCUMENTS

EP    3 094 071 A1    11/2016
JP    2014-063472     4/2014

OTHER PUBLICATIONS

Extended European Search Report dated Dec. 11, 2018 in European Patent Application No. 18181335.3, 11 pages.
(Continued)

*Primary Examiner* — Eric A. Rust
(74) *Attorney, Agent, or Firm* — Oblon, McClelland, Maier & Neustadt, L.L.P.

(57) ABSTRACT

An information processing apparatus is capable of displaying terms each having a character string embedded in an application and terms each having a character string to be added by at least one term module for the application, on a screen of the application. The information processing apparatus includes circuitry. The circuitry determines, during startup of the information processing apparatus, whether at least one of the application and the at least one term module has been updated. The circuitry generates association information to be stored in a memory, based on determination that at least one of the application and the at least one term module has been updated. The circuitry acquires one of term identification information of the application and term identification information of the at least one term module from the memory. The circuitry selects a character string to be displayed, using the term identification information acquired.

10 Claims, 10 Drawing Sheets

(51) Int. Cl.
*G06F 8/65* (2018.01)
*G06F 8/61* (2018.01)
*G06F 17/27* (2006.01)

(56) References Cited

U.S. PATENT DOCUMENTS

| | | |
|---|---|---|
| 2014/0082609 A1 | 3/2014 | Ono |
| 2014/0250444 A1 | 9/2014 | Ono |
| 2016/0299890 A1* | 10/2016 | Masuko ............... G11B 27/031 |
| 2016/0357734 A1 | 12/2016 | Harada |
| 2017/0013147 A1 | 1/2017 | Umezawa et al. |
| 2017/0052689 A1 | 2/2017 | Umezawa et al. |
| 2017/0075554 A1 | 3/2017 | Sasayama |
| 2017/0078498 A1 | 3/2017 | Hirokawa |
| 2018/0068345 A1 | 3/2018 | Hirokawa et al. |

OTHER PUBLICATIONS

Tilo: "Check if my IOS application is updated", https://stackoverflow.com/questions/16899503/check-if-my-ios-application-is-updated, XP055525759, Jun. 3, 2013, 1 page.
Anonymous: "mysql—select only one element from an priority ordered group with limits?—Database Administrators Stack Exchange", https://dba.Stackexhchange.com/questions/135399/select-only-one-element-from-an-priority-ordered-group-with-limits,XP055525795, Apr. 15, 2016, 3 pages.

* cited by examiner

TERM FILE IN APPLICATION A

| TERM-FILE LANGUAGE | EXEMPLE DESCRIPTION OF TERM FILE (xml FILE) |
|---|---|
| JAPANESE<br>ENGLISH | <string name="app_name">アプリ</string><br><string name="app_name">app</string> |

FIG. 4B

TERM FILE IN TERM MODULE AX

| TERM-FILE LANGUAGE | EXEMPLE DESCRIPTION OF TERM FILE (xml FILE) |
|---|---|
| GERMAN | <string name="app_name">anwendung</string> |

FIG. 4C

TERM FILE IN TERM MODULE AY

| TERM-FILE LANGUAGE | EXEMPLE DESCRIPTION OF TERM FILE (xml FILE) |
|---|---|
| JAPANESE<br>FRENCH<br>ITALIAN | <string name="app_name">アプリケーション</string><br><string name="app_name">app</string><br><string name="app_name">applicazione</string> |

FIG. 5

| TAG | EXEMPLE DESCRIPTION |
|---|---|
| overlay | <overlay os:targetPackage="com.example.app" os:priority="1"/> |

FIG. 6

| PRIORITY | TERM MODULE |
|---|---|
| 1 | TERM MODULE AX |
| 2 | TERM MODULE AY |
| 3 | APPLICATION A |

FIG. 7A

TERM-ID MANAGEMENT TABLE FOR TERM MODULE AX

| TERM ID | TERM IDENTIFICATION NUMBER OF APPLICATION A | TERM IDENTIFICATION NUMBER OF TERM MODULE AX |
|---|---|---|
| app_name | 0x0001 | 0x1002 |
| ... | ... | ... |

FIG. 7B

TERM-ID MANAGEMENT TABLE FOR TERM MODULE AY

| TERM ID | TERM IDENTIFICATION NUMBER OF APPLICATION A | TERM IDENTIFICATION NUMBER OF TERM MODULE AY |
|---|---|---|
| app_name | 0x0001 | 0x2003 |
| ... | ... | ... |

FIG. 8

| APPLICATION NAME | UPDATE INFORMATION |
|---|---|
| APPLICATION A | True (UPDATED) |
| ... | ... |

DISPLAYING TERMS HAVING CORRESPONDING CHARACTER STRINGS ON A DISPLAY

CROSS-REFERENCE TO RELATED APPLICATIONS

This patent application is based on and claims priority pursuant to 35 U.S.C. § 119(a) to Japanese Patent Application No. 2017-133151, filed on Jul. 6, 2017, the entire disclosure of which is hereby incorporated by reference herein.

BACKGROUND

Technical Field

The present disclosure relates to an information processing apparatus and a non-transitory computer-readable medium.

Description of the Related Art

Character strings to be displayed on a screen of an application in Android (registered trademark), which is an example of an operating system (OS), are typically embedded in the application. A technique is known for dynamically changing character strings to be displayed on the screen of the application. Further, a technique is known for adding character strings that are not originally embedded in the application.

SUMMARY

An information processing apparatus is capable of displaying terms each having a character string embedded in an application and terms each having a character string to be added by at least one term module for the application, on a screen of the application. The information processing apparatus includes circuitry. The circuitry determines, during startup of the information processing apparatus, whether at least one of the application and the at least one term module has been updated. The circuitry generates association information to be stored in a memory, based on determination that at least one of the application and the at least one term module has been updated. The association information associates, for each of the terms, term identification information of the application identifying the character string embedded in the application with term identification information of the at least one term module identifying the character string embedded in the at least one term module. The circuitry acquires one of the term identification information of the application and the term identification information of the at least one term module from the memory. The circuitry selects a character string to be displayed on the screen of the application, using the term identification information acquired.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

An embodiment of the present disclosure will be described in detail below with reference to the drawings.

<Hardware Configuration>

Figure 1:
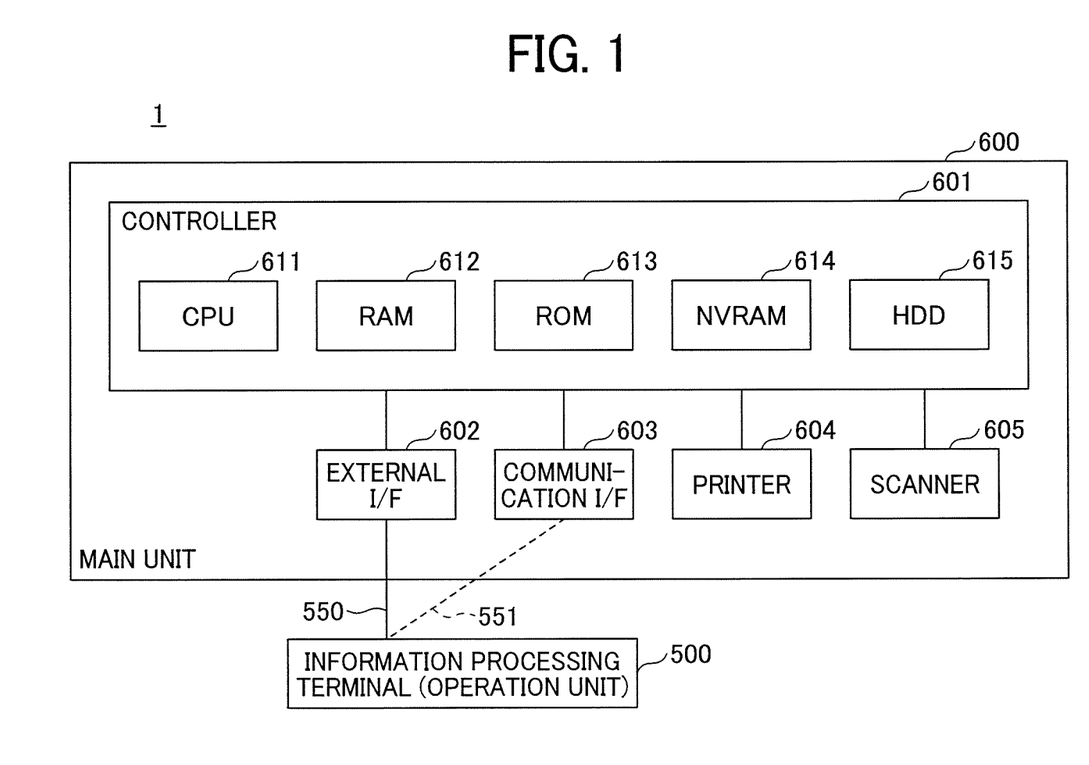
FIG. 1 is a block diagram illustrating an example of a hardware configuration of an image forming apparatus, according to an embodiment of the present invention.

A hardware configuration of an image forming apparatus 1 according to the present embodiment, will be described with reference to FIG. 1. FIG. 1 is a block diagram illustrating an example of a hardware configuration of the image forming apparatus 1, according to the present embodiment. Although in FIG. 1, a hardware configuration of a multifunction peripheral (MFP) is illustrated as an example of the image forming apparatus 1, the image forming apparatus 1 may be any other suitable apparatus. The multifunction peripheral is an apparatus including a plurality of functions, such as a print function, a scanner function, and a copy function.

The image forming apparatus 1 illustrated in FIG. 1 includes an information processing terminal 500 and a main unit 600. The information processing terminal 500 functions as an operation unit that receives an operation of a user. Examples of the information processing terminal 500 includes a tablet terminal. The main unit 600 implements various functions, such as the print function, the scanner function, and the copy function.

The information processing terminal 500 and the main unit 600 are mutually communicably connected through a communication channel 550. The communication channel 550 may be in compliance with a universal serial bus (USB) standard, for example. The information processing terminal 500 and the main unit 600 may communicate with each other have a communication channel 551 through a short-range wireless communication network, such as a local area network (LAN) or Bluetooth (registered trademark). In another example, the image forming apparatus 1 of FIG. 1 is regarded as an image forming system including the information processing terminal 500 and the main unit 600.

The main unit 600 includes a controller 601, an external interface (I/F) 602, a communication interface (I/F) 603, a printer 604, and a scanner 605. The controller 601 includes a central processing unit (CPU) 611, a random-access memory (RAM) 612, a read-only memory (ROM) 613, a non-volatile random-access memory (NVRAM) 614, and a hard disk drive (HDD) 615. The ROM 613 stores various programs and data. The RAM 612 temporarily stores programs and data. The NVRAM 614 stores, for example, setting information. The HDD 615 stores various programs and data.

The CPU 611 loads the programs, data, or the setting information from the ROM 613, the NVRAM 614, or the HDD 615 onto the RAM 612 for processing, to control entire operation of the main unit 600 and implement various functions.

The external I/F 602 is an interface that enables the main unit 600 to communicate with the information processing terminal 500 through the communication channel 550. The communication I/F 603 is an interface that connects the main unit 600 to the information processing terminal 500 or a network through the communication channel 551.

The printer 604 forms an image onto a conveyed object according to print data. Examples of the conveyed object include, but not limited to, paper, coated paper, thick paper, overhead projector (OHP) film, plastic film, prepreg, and copper foil. The scanner 605 reads image data (electronic data) from an original, to generate an image file (electronic file).

Figure 2:
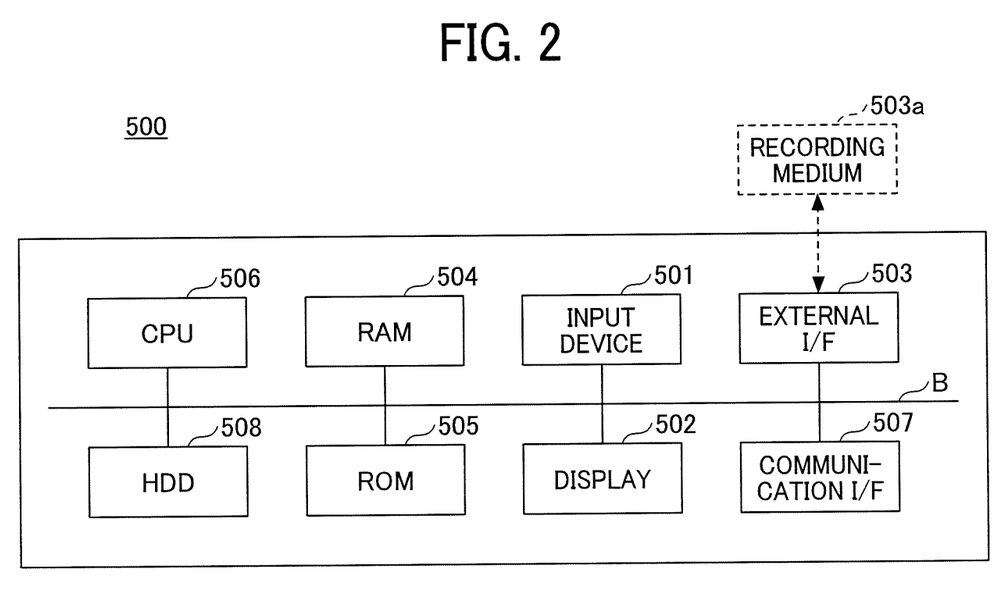
FIG. 2 is a block diagram illustrating an example of a hardware configuration of an information processing terminal, according to an embodiment of the present invention.

The information processing terminal 500 that functions as the operation unit, is implemented by, for example, a computer having a hardware configuration illustrated in FIG. 2. FIG. 2 is a block diagram illustrating an example of a hardware configuration of the information processing terminal 500, according to the present embodiment.

The information processing terminal 500 of FIG. 2 includes an input device 501, a display 502, an external interface (I/F) 503, a random access memory (RAM) 504, a read only memory (ROM) 505, a central processing unit (CPU) 506, a communication interface (I/F) 507, and a hard disk drive (HDD) 508, mutually connected through a bus B. The input device 501 includes a touch panel and hardware keys, and the user inputs an operation signal into the input device 501. The display 502 includes a liquid crystal display (LCD), and displays information. The communication I/F 507 is an interface that connects the information processing terminal 500 to the main unit 600 or various networks.

The HDD 508 is an example of a nonvolatile storage device storing programs and data. Examples of the stored program and data include an operating system (OS), which is basic software for controlling entire operation of the information processing terminal 500, and an application for providing various functions on the OS. The information processing terminal 500 may include, instead of or in alternative to the HDD 508, a drive that uses, as a storage medium, a flash memory such as a solid state drive (SSD).

The external I/F 503 in an interface that connects the information processing terminal 500 with the main unit 600 or a recording medium 503a. The information processing terminal 500 reads or writes data to and from the recording medium 503a through the external I/F 503. Examples of the recording medium 503a include a flexible disk, a compact disc (CD), a digital versatile disc (DVD), a secure digital (SD) memory card, and a USB memory.

The ROM 505 is an example of a nonvolatile semiconductor memory (storage) capable of storing a program and data even after the information processing terminal 500 is turned off as the power is not supplied. The ROM 505 stores programs and data, such as OS settings, network settings, and a basic input output system (BIOS) to be performed when the information processing terminal 500 is started up. The RAM 504 is an example of a volatile semiconductor memory (storage) that temporarily stores programs and data.

The CPU 506 loads programs or data from a storage device such as the ROM 505 and the HDD 508 onto the RAM 504 for processing, to control entire operation of the information processing terminal 500 and implement the various functions. The hardware configuration as in FIG. 2 allows the information processing terminal 500 to function as: an input unit that receives an input from the user; and a display unit that performs displaying.

The information processing terminal 500 according to the present embodiment, is an example of an information processing apparatus capable of adding terms to be displayed by an application, using at least one term module. The image forming apparatus 1 is also an example of an information processing apparatus capable of adding terms to be displayed by an application, using at least one term module. The image forming apparatus 1 of FIG. 1 includes the information processing terminal 500 and the main unit 600 separated from each other. However, the image forming apparatus 1 may include the information processing terminal 500 built in the main unit 600 as the operation unit, or may include the main unit 600 having the function of the information processing terminal 500.

<Software Configuration>

Figure 3:
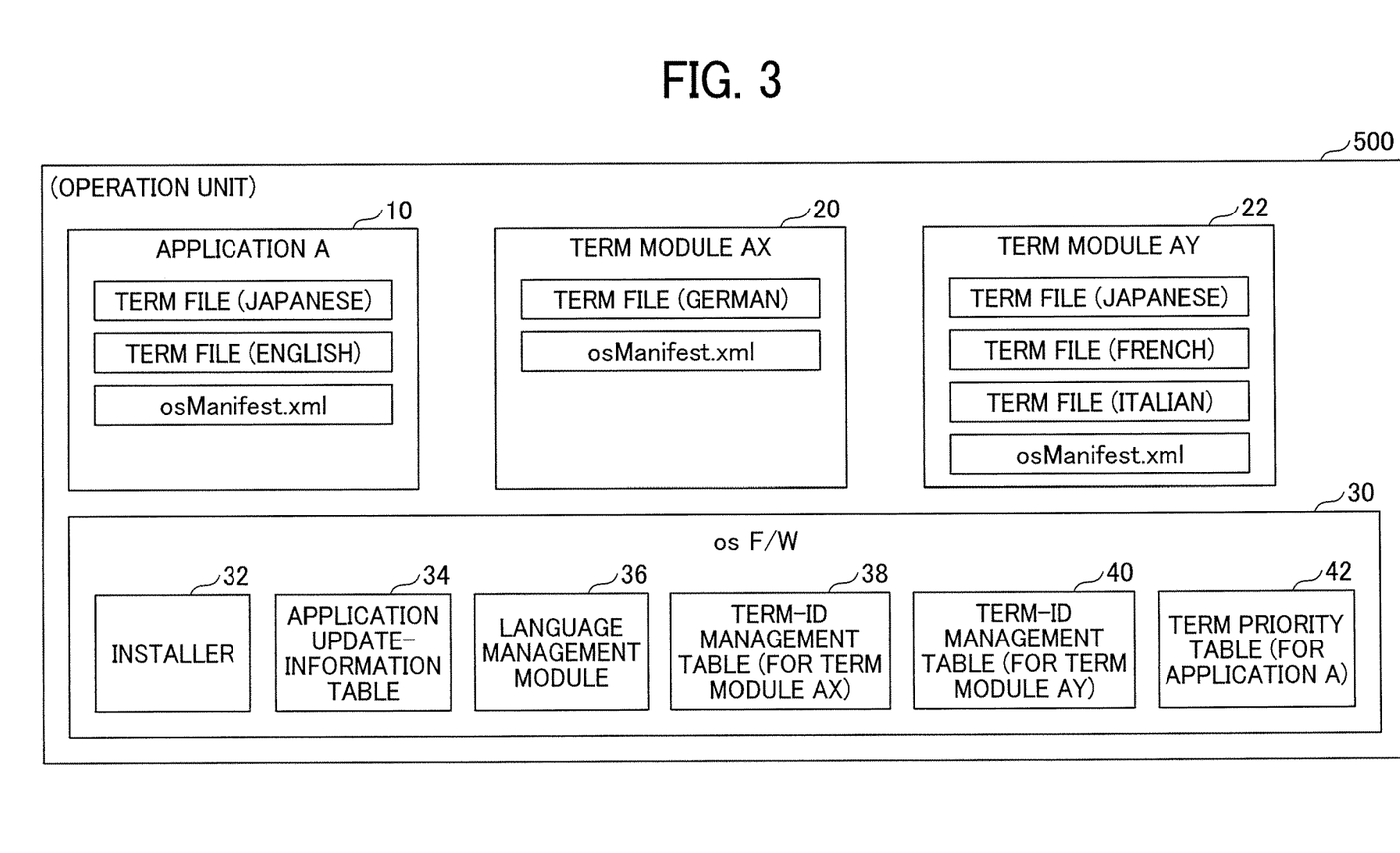
FIG. 3 is a block diagram illustrating an example of a software configuration of the information processing terminal that functions as an operation unit, according to an embodiment of the present invention.

Next, a description is given of a functional configuration of the information processing terminal 500 of the image forming apparatus 1, according to the present embodiment. FIG. 3 is a block diagram of an example of software configuration of the information processing terminal 500 that functions as an operation unit. The information processing terminal 500 of FIG. 3 includes an application 10, a term module 20, and a term module 22 corresponding to the application 10, and an OS framework (OS F/W) 30.

The OS F/W 30 is an OS of the information processing terminal 500, and is, for example, Android (registered trademark). The application 10 is a program that operates on the OS F/W 30 of the information processing terminal 500. The application 10 stores a plurality of term files. The term files each stores terms to be displayed on a screen of the application 10, the terms being described in a language, such as Japanese or English. The application 10 is arranged on the OS F/W 30 in FIG. 3, but may be arranged in the OS F/W 30.

Each of the term module 20 and the term module 22 is a module having addition/correction terms corresponding to the application 10, and stores a plurality of term files. Each of the term module 20 and the term module 22 has a format equivalent to the format of the application. Each of the term files stored by the application 10, the term module 20 and the term module 22, is a file of terms to be displayed in the application, the terms being described in each language such as Japanese or English.

Furthermore, the application 10, the term module 20 and the term module 22 each include "osManifest.xml", which is a file describing static information regarding the application 10 (e.g., an application name and a version name).

The OS F/W 30 of FIG. 3 includes an installer 32, an application update-information table 34, a language management module 36, a term-ID management table 38, a term-ID management table 40, and a term priority table 42.

The installer 32 installs the application 10, the term module 20, and the term module 22 onto the information processing terminal 500. The application update-information table 34 stores update information regarding the application 10. The language management module 36 manages the term-ID management table 38, the term-ID management table 40, and the term priority table 42.

The term-ID management table 38 is for the term module 20, and associates the terms in the application 10 with the terms in the term module 20. The term-ID management table 40 is for the term module 22, and associates the terms in the application 10 with the terms in the term module 22. The term priority table 42 is for the application 10, and indicates which terms in the application 10, the term module 20 and the term module 22 are to be preferentially displayed.

In FIG. 3, an example is illustrated in which one application 10 is installed. In another example, a plurality of applications and term modules corresponding to the plurality of applications are installed.

Figure 4A:
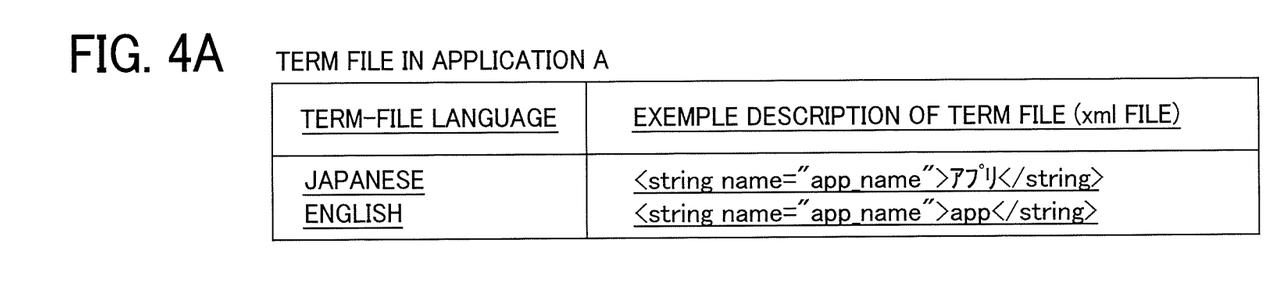
FIGS. 4A, 4B, and 4C are illustrations of examples of descriptions of term files, according to an embodiment of the present invention.
Figure 4B:
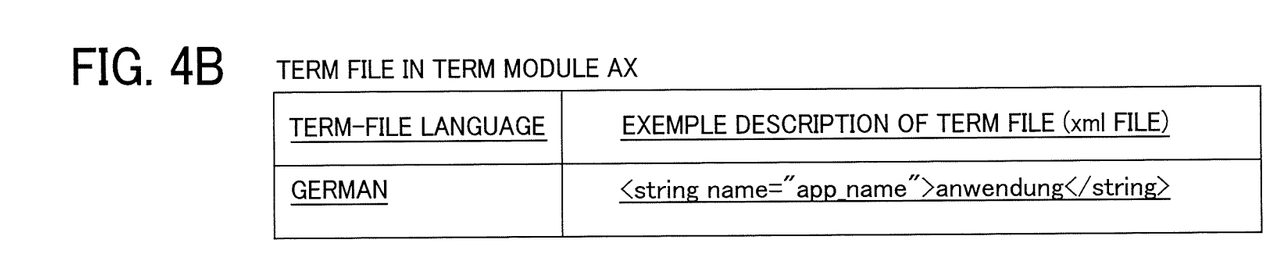
Figure 4C:
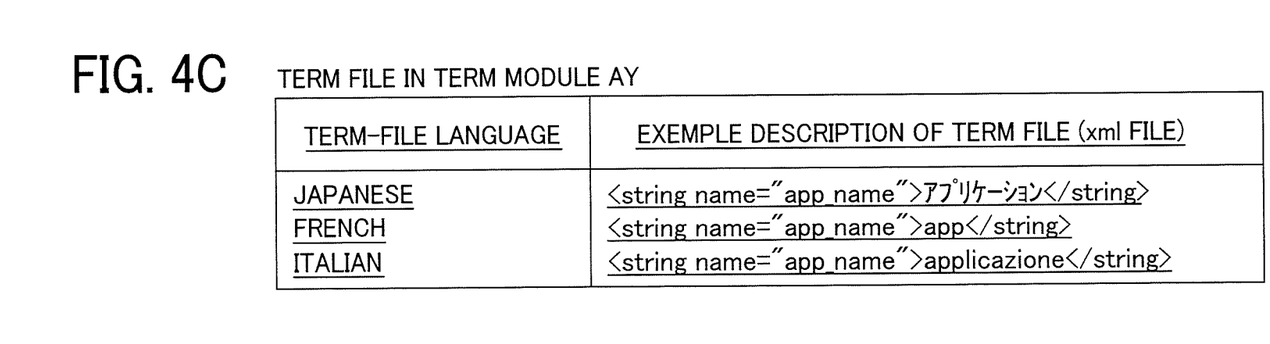

FIGS. 4A, 4B, and 4C illustrates examples of descriptions of the term files. In examples of FIGS. 4A, 4B, and 4C, the term files are described in an extensible markup language (xml) format. The term files of FIGS. 4A, 4B, and 4C are provided for different languages. The term files define respective terms having an identical term ID (app_name). Thus, when the information processing terminal 500 specifies the term ID to a position at which a character string is to be displayed on an application screen, even if the language in the operation unit is changed to a language, the character string can be displayed in the language after the change. In the example of FIG. 4A, when Japanese is set to the language in the operation unit, a Japanese character string "アプリ" (meaning "app" in English) is displayed. When English is set to the language in the operation unit, a character string "app" is displayed.

In a case where the term module 20 and the term module 22 each add a language to the application 10, the terms are defined by term IDs identical to the term IDs of the terms in the application 10 to which the language is to be added, in each of the term module 20 and the term module 22. In an example of "TERM FILE IN TERM MODULE AX" of FIG. 4B, for example, when German is set to the language in the operation unit, a character string "anwendung" is displayed.

Furthermore, in a case where the term module 20 and term module 22 each correct a term in the application 10, the term is defined by a term ID identical to the term ID of the term to be corrected in the application 10, in each of the term module 20 and the term module 22. In an example of "TERM FILE IN TERM MODULE AY" of FIG. 4C, for example, when Japanese is set to the language in the operation unit, a character string "アプリケーション" (meaning "application" in English) is displayed.

In order to facilitate the management of the terms, the OS F/W 30 manages the terms by assigning a numerical value such as "0x000", which is a unique value in the application 10, to a term ID such as "app_name". This also applies to the terms to be defined in the term module 20 and term module 22, in addition to the application 10. Hereinafter, the numerical value assigned to the term ID will be referred to as a term identification number.

The term identification number is assigned to each application 10, and mutually different numbers are given for "app_name" in the application 10, the term module 20 and the term module 22. The term identification number may vary each time the application 10 is updated. The term-ID management table 38 and the term-ID management table 40 are required in order to retain the association between the term ID, the term identification number of the application 10, the term identification number of the term module 20, and the term identification number of the term module 22.

Figure 5:
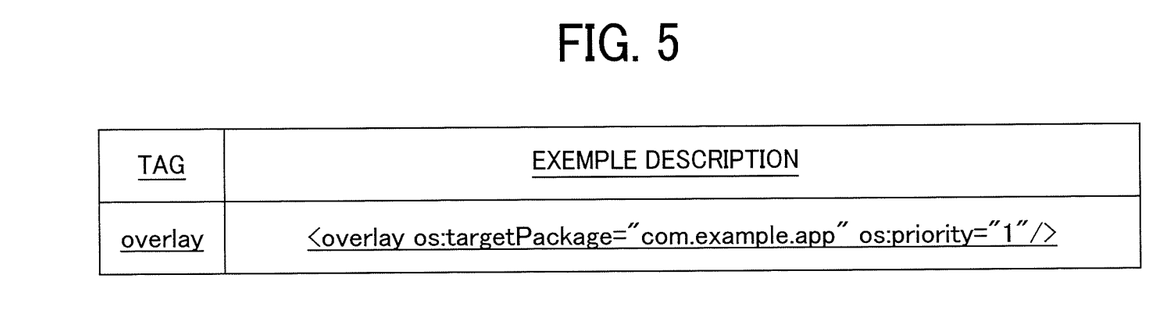
FIG. 5 is an illustration for describing an additional tag of "osManifest.xml", according to an embodiment of the present invention.

FIG. 5 is an illustration for describing an additional tag of "osManifest.xml". "osManifest.xml" illustrated in FIG. 5 is a file describing information regarding the application 10, included in each of the application 10, the term module 20 and the term module 22. For example, an item of FIG. 5 is described in "osManifest.xml" in each of the term module 20 and the term module 22.

A tag "overlay" describes to which application 10 the term module 20 and the term module 22 perform term addition/correction. "targetPackage" describes the package name of the application 10 as a target. "targetPackage" specifies the application 10 to which the term addition/correction is to be performed.

"priority" describes priority. Even when the term module 20 and the term module 22 have the same "targetPackage", an order in which the term module 20 and the term module 22 are checked is determined based on the priority described in the "priority". For example, the larger the numerical value of "priority", the higher the priority.

Figure 6:
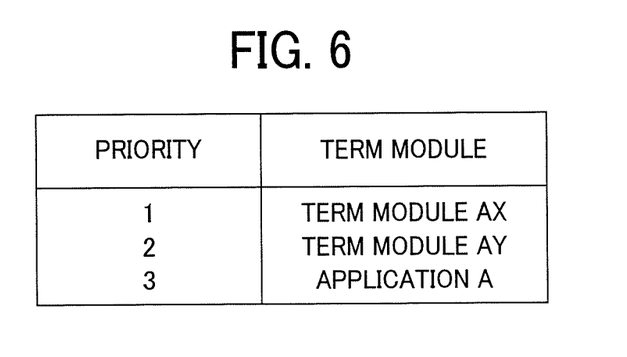
FIG. 6 is an illustration of an example data structure of a term priority table, according to an embodiment of the present invention.

FIG. 6 is an illustration of an example data structure of a term priority table. The term priority table 42 indicates which terms in the term module 20 and the term module 22 corresponding to the application 10 are to be preferentially displayed. In FIG. 6, for example, for a term that does not present in the term module 20 to which a highest priority is assigned, the term in the term module 22, to which a second highest priority is assigned, is used. For a term that does not present in the term module 22 to which a second highest priority is assigned, the term in the application 10, to which a third highest priority is assigned, is used. In this manner, the terms are preferentially applied in the order of the term module 20, the term module 22, and the application 10 in the term priority table 42 of FIG. 6. During the startup of the information processing terminal 500, the OS F/W 30 acquires numerical values for "priority" from "osManifest.xml" included in the term module 20 and the term module 22 and compares the acquired numerical values, to create the term priority table 42.

Figure 7A:
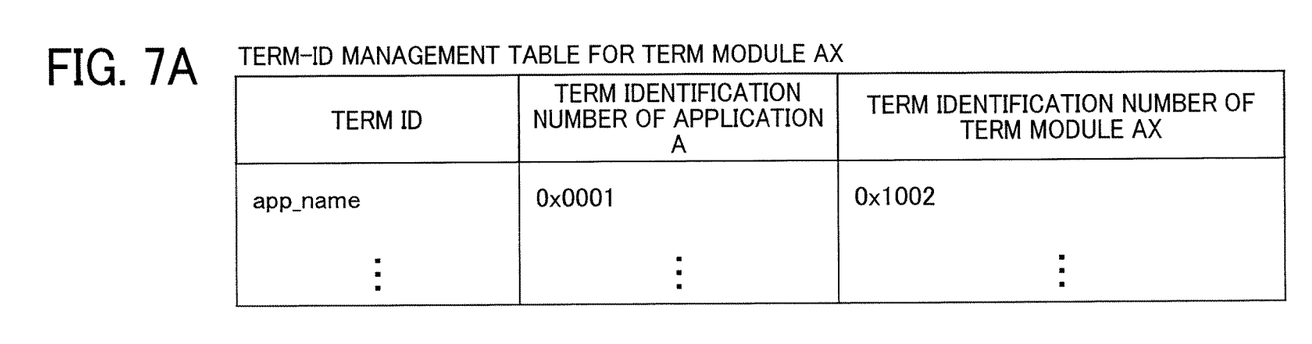
FIGS. 7A and 7B are illustrations of example data structures of term-ID management tables, according to an embodiment of the present invention.
Figure 7B:
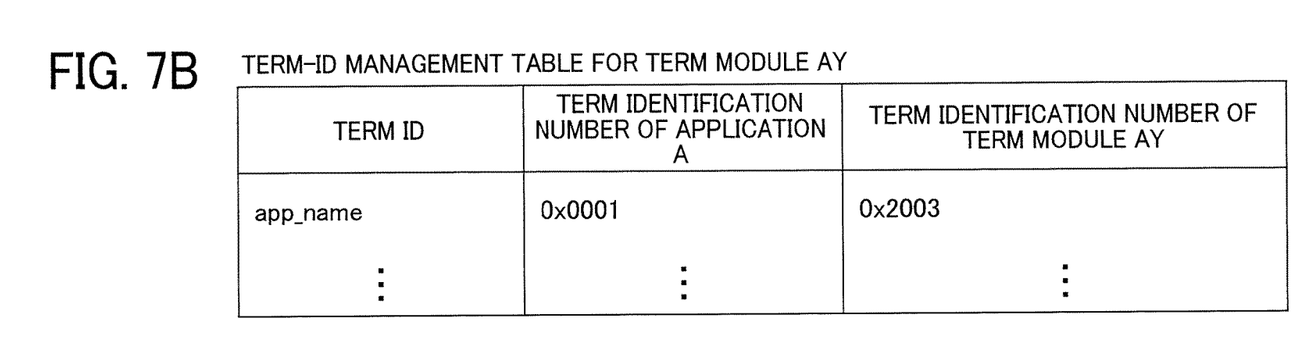

FIGS. 7A and 7B are illustrations of example data structures of the term-ID management table 38 and the term-ID management table 40. The number of term-ID management tables is equal to the number of term modules corresponding to each application. For example, in a case where the term module 20 and the term module 22 are provided for the application 10, the term-ID management table 38 storing association information indicating the association between the application 10 and the term module 20 and the term-ID management table 40 storing association information indicating the association between the application 10 and the term module 22, are provided.

The term-ID management table 38 associates the term ID, the term identification number of the application 10, and the term identification number of the term module 20 with each other. The term-ID management table 40 associates the term ID, the term identification number of the application 10, and the term identification number of the term module 22 with each other. The term-ID management table 38 and the term-ID management table 40 store the term identification numbers assigned by the OS F/W 30 to all the term IDs to be defined by the application 10, the term module 20, and the term module 22. Thus, the terms defined by the application 10, the term module 20 and the term module 22, are in association together.

Figure 8:
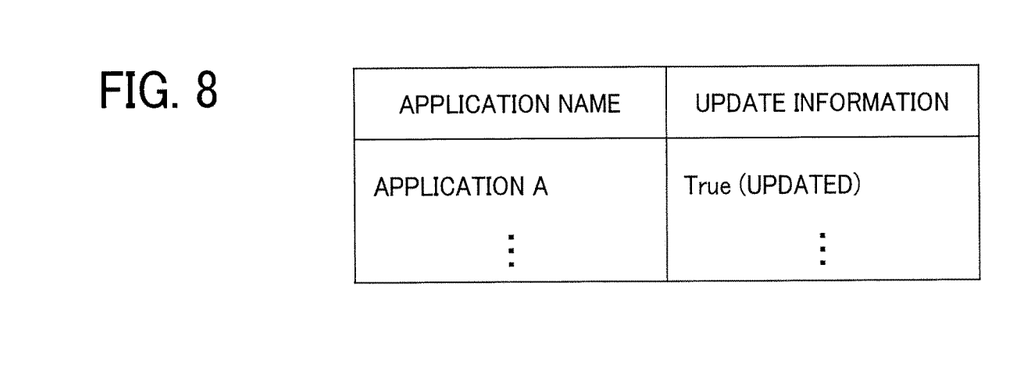
FIG. 8 is an illustration of an example of data structure of an application update-information table, according to an embodiment of the present invention.

FIG. 8 is an illustration of an example of data structure of the application update-information table 34. The application update-information table 34 stores update information indicating whether each application has been updated. In the example of FIG. 3, when the installer 32 updates (or newly installs) the application 10, "UPDATE INFORMATION" in the application update-information table 34 has "True". Then, after creation of the term-ID management table 38 and the term-ID management table 40 during the startup of the information processing terminal 500, "UPDATE INFORMATION" in the application update-information table 34 has "False".

<Details of Processing>

The information processing terminal 500 according to the present embodiment creates the term-TD management table 38 and the term-ID management table 40 in a case where the following conditions in which the contents of the term-ID management tables 38 and 40 are likely to change, are satisfied, instead of creating the term-ID management table 38 and the term-ID management table 40 each time startup is performed. In the present embodiment, the conditions in which the contents of the term-ID management table 38 and the term-ID management table 40 are likely to change, include an update of the application 10 and updates of the term module 20 and the term module 22.

In a case where the application 10 has been updated, it is likely that the term identification number of the application 10 is changed and it is likely that a new term has been added. In this case, the term identification number of the application 10 in each of the term-ID management table 38 and the term-ID management table 40 do not correspond due to the update, thus recreation of the term-ID management table 38 and the term-ID management table 40 is required.

Therefore, when the application 10 is updated (or newly installed), the information processing terminal 500 according to the present embodiment stores, in the application update-information table 34, the update information indicating that the application 10 has been updated. The information processing terminal 500 refers to the application update-information table 34 during startup, to recreate the term-ID management table 38 and the term-ID management table 40 based on the update information indicating that the application 10 has been updated.

In a case where the term module 20 and the term module 22 have been updated, recreation of the term-ID management table 38 and the term-ID management table 40 is required because of the same reason as in the case where the application 10 has been updated. When the term module 20 and/or the term module 22 are updated (or newly installed), the information processing terminal 500 according to the present embodiment deletes the term-ID management table 38 for the updated term module 20 and/or the term-ID management table 40 for the updated term module 22. During startup, the information processing terminal 500 checks whether the term-ID management table 38 and/or the term-ID management table 40 are present, to recreate the term-ID management table 38 and/or the term-ID management table 40 that are identified as not being present.

When the term module 20 and the term module 22 are updated (or newly installed), the information processing terminal 500 according to the present embodiment may store update information indicating that the term module 20 and the term module 22 have been updated, similarly to the application update-information table 34. In this case, during startup, the information processing terminal 500 refers to a table storing the update information indicating that the term module 20 and/or the term module 22 have been updated, to recreate the term-ID management table 38 and/or the term-ID management table 40, based on the update information indicating that the term module 20 and/or the term module 22 have been updated.

The application 10, the term module 20 and the term module 22 are not updated frequently. The information processing terminal 500 according to the present embodiment decreases the frequency of creation of the term-ID management table 38 and the term-ID management table 40, to prevent startup time from getting long steadily in accordance with an increase in the number of applications 10 or the number of terms.

In a case where the present embodiment is applied to the conventional OS F/W 30 designed to recreate all the term-ID management tables during the startup of the information processing terminal 500, the term-ID management tables for term modules in which no contents are likely to change may be controlled not to be recreated.

<<Startup Processing>>

Figure 9:
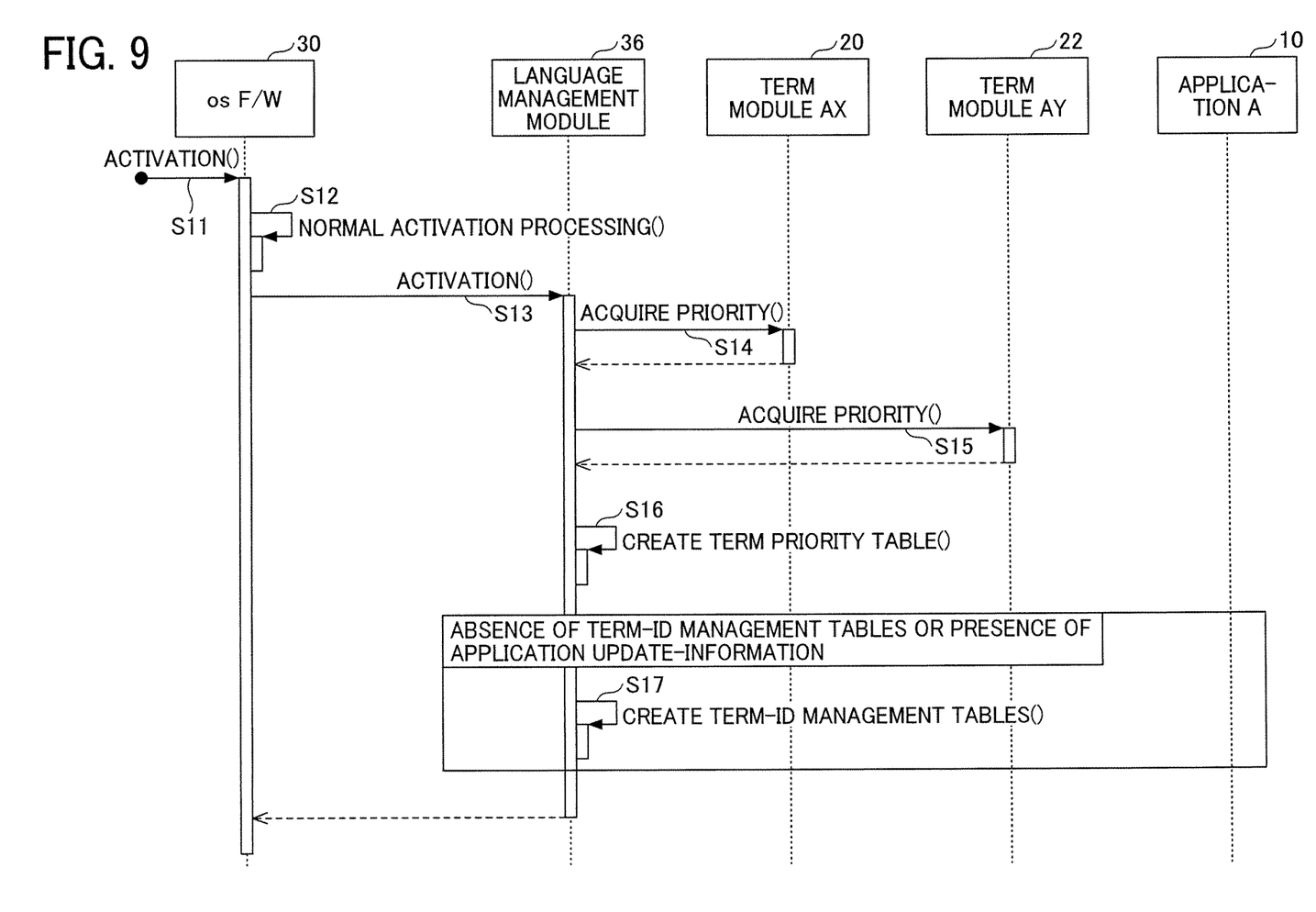
FIG. 9 is a sequence diagram illustrating an example of startup processing of the information processing terminal, according to an embodiment of the present invention.

FIG. 9 is a sequence diagram illustrating an example of startup processing by the information processing terminal 500. Although the sequence diagram of FIG. 9 illustrates processing in a case where the application 10 has been installed, in a case where another application has been installed, similar processing is required for each application.

At step S11, the OS F/W 30 is started up. At step S12, the OS F/W 30 performs normal startup processing. After the normal startup processing, the OS F/W 30 makes a startup request to the language management module 36, at step S13.

In response to the startup request received from the OS F/W 30, the language management module 36 acquires numerical values of "priority" from the term module 20 and the term module 22 at steps S14 and S15, respectively, and compares the numerical values, to create the term priority table 42 for the application 10 illustrated in FIG. 6.

Then, in a case where the conditions in which the contents of the term-1D management table 38 and the term-ID management table 40 are likely to change, are satisfied, the processing proceeds to step S17. At step S17, the language management module 36 creates the term-ID management table 38 and the term-ID management table 40. In FIG. 9, a condition in which the contents of the term-ID management table 38 and the term-ID management table 40 are likely to change, is the absence of the term-ID management table 38 and the term-ID management table 40 or retention of the update information indicating that the application 10 has been updated, in the application update-information table 34. The details of the process at step S17 will be described later.

<<Term-Display Processing>>

Figure 10:
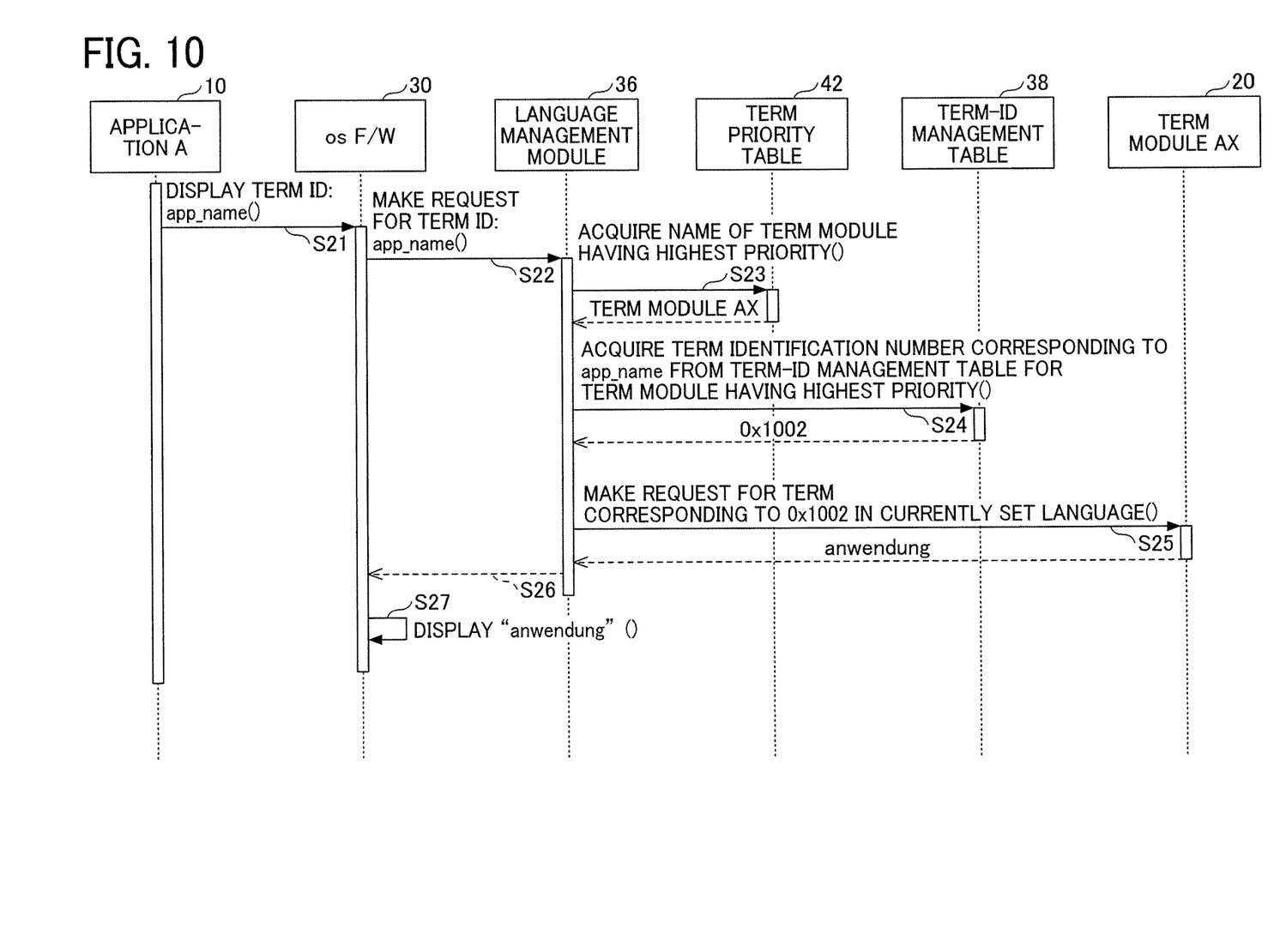
FIG. 10 is a sequence diagram illustrating an example of term-display processing of the information processing terminal, according to an embodiment of the present invention.

FIG. 10 is a sequence diagram illustrating an example of term-display processing by the information processing terminal 500. To display a term (character string) corresponding to a term ID, the application 10 specifies the term ID and makes a request to the OS F/W 30 for the display, at step S21. The processing proceeds to step S22, and the OS F/W 30 specifies the term ID and makes a request to the language management module 36 for the character string.

The processing proceeds to step S23, and the language management module 36 refers to the term priority table 42 as in FIG. 6, to acquire a name of the term module to which the highest priority is assigned. In this example, a name "term module AX" of the term module 20 is acquired. The processing proceeds to step S24, and the language management module 36 refers to the term-ID management table 38 for the term module 20, to which the highest priority is assigned, to acquire the term identification number "0x1002" of the term module 20 corresponding to the term ID from the OS F/W 30.

The processing proceeds to step S25, and the language management module 36 passes the acquired term identification number "0x1002" of the term module 20 to the term module 20, to acquire the character string "anwendung" corresponding to the term identification number "0x1002". At step S26, the language management module 36 passes the acquired character string "anwendung" to the OS F/W 30. At step S27, the OS F/W 30 displays the character string "anwendung" acquired from the language management module 36.

<<Creation-Determination Processing for Term-ID Management Table>>

Figure 11:
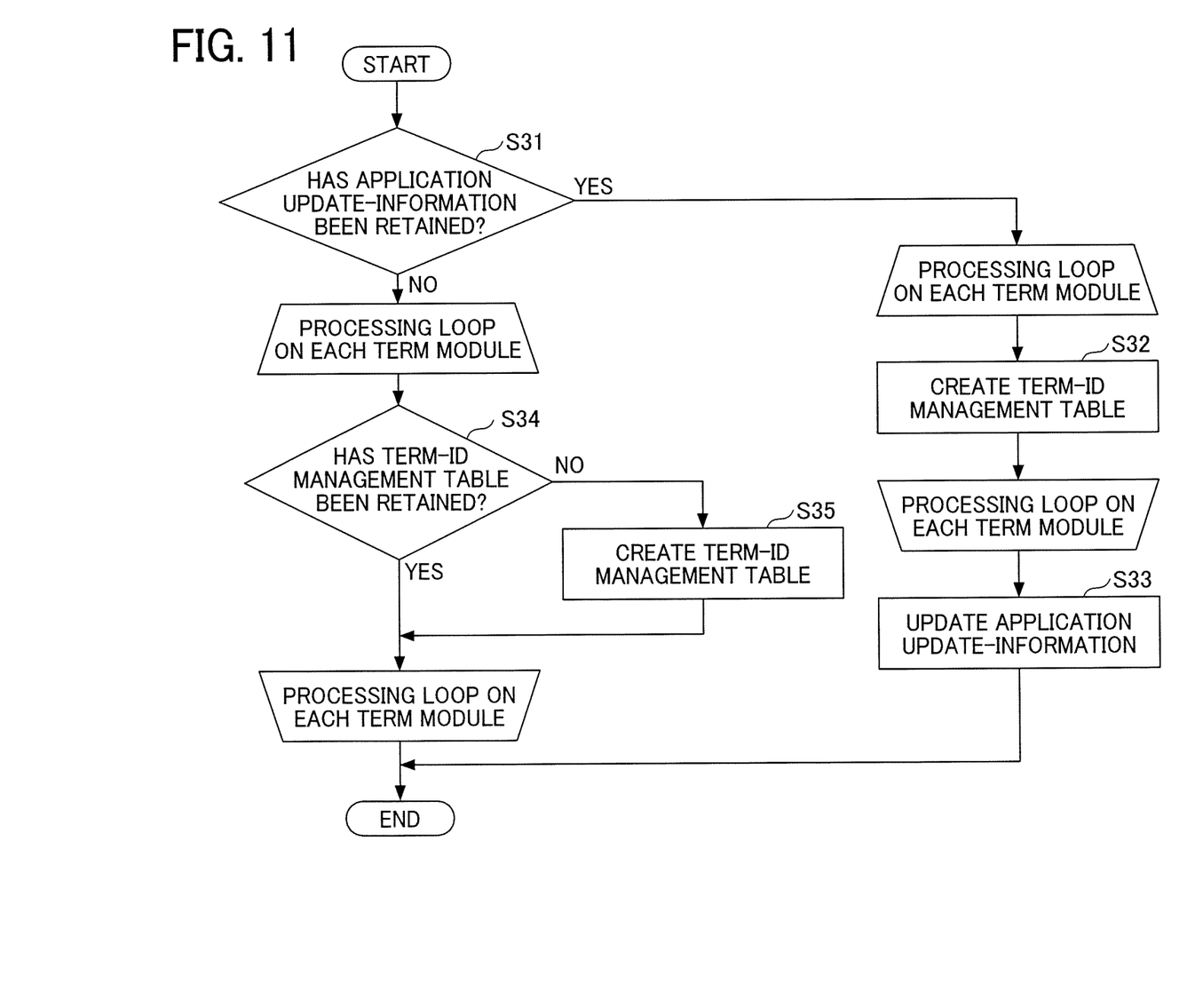
FIG. 11 is a flowchart illustrating an example of creation-determination processing for the term-ID management tables, performed by a language management module according to an embodiment of the present invention.

FIG. 11 is a flowchart illustrating an example of creation-determination processing for the term-ID management table 38 and the term-ID management table 40, performed by the language management module 36. The creation-determination processing for the term-ID management table 38 and the term-ID management table 40 corresponds to the details of the processing at step S17 of FIG. 9.

At step S31, the language management module 36 determines whether the application update-information table 34 of FIG. 8 stores the update information "True" indicating that the application 10 has been updated.

When the application update-information table 34 stores the update information indicating that the application 10 has been updated, the processing proceeds to step S32. At step S32, the language management module 36 creates the term-ID management table 38 and the term-ID management table 40 for both of the term module 20 and the term module 22 corresponding to the application 10. After the creation of the term-ID management table 38 and the term-ID management table 40, the operation proceeds to step S33. At step S33, the language management module 36 updates the update information "True" stored in the application update-information table 34 of FIG. 8, to "False". The update information "False" indicates that the application 10 has not been updated.

When the application update-information table 34 does not store the update information indicating that the application 10 has been updated, the language management module 36 performs the processes of steps S34 and S35 on the term module 20 and the term module 22. At step S34, the language management module 36 determines whether the term-ID management table 38 and the term-ID management table 40 exist for the term module 20 and the term module 22, respectively.

When no term-ID management table 38 exists, the processing proceeds to step S35. At step S35, the language management module 36 creates the term-ID management table 38 for the term module 20. When no term-ID management table 40 exists, the processing proceeds to step S35. At step S35, the language management module 36 creates the term-ID management table 40 for the term module 22.

Although in FIG. 11, the conditions in which the contents of the term-ID management table 38 and the term-ID management table 40 are likely to change, include "the presence or absence of the update information indicating that the application 10 has been updated" and "the presence or absence of the term-ID management tables", either one of the conditions will suffice. Adoption of both the conditions increases the frequency in which the information processing terminal 500 according to the present embodiment reduces startup time.

<<Installation/Update Processing of Installer>>

Figure 12:
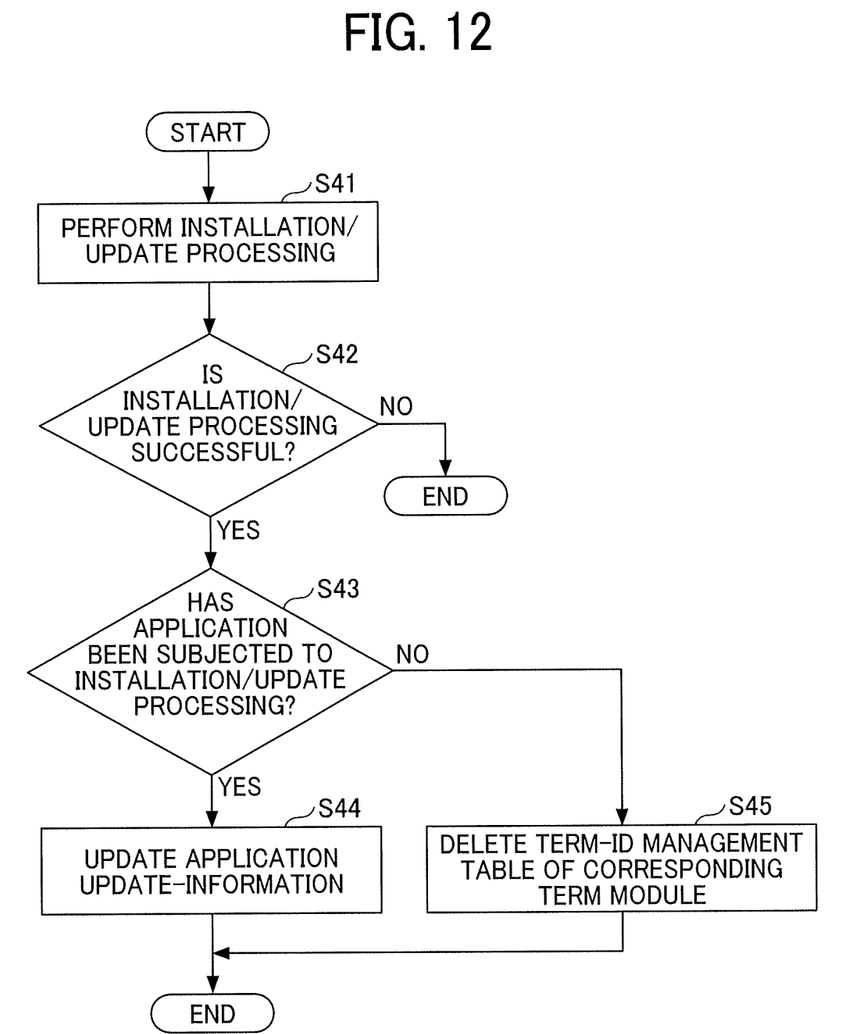
FIG. 12 is a flowchart illustrating an example of installation/update processing performed by an installer, according to an embodiment of the present invention.

FIG. 12 is a flowchart illustrating an example of installation/update processing performed by an installer. At step S41, the installer 32 performs installation/update processing. When the installation/update processing at step S41 is unsuccessful, the processing of FIG. 12 ends.

When the installation/update processing at step S41 is successful, the installer 32 determines whether the installation/update processing has been performed on the application 10. When the installer 32 determines that the installation/update processing has been performed on the application 10, the processing proceeds to step S44. At step S44, the installer 32 stores the update information "True" indicating that the application 10 has been updated, in the application update-information table 34 of FIG. 8. When the installer 32 determines that the installation/update processing has been performed on any other target than the application 10, the processing proceeds to step S45. At step S45, the installer 32 deletes, for example, the term-ID management table 38 for the term module 20 and/or the term-ID management table 40 for the term module 22, on which the installation/update processing has been performed.

In the present embodiment, a description is given heretofore of an example in which the determination is performed as to whether the creation of the term-ID management table 38 and the term-ID management table 40 is required during the startup of the information processing terminal 500, based on "the presence or absence of the term-ID management table 38 and the term-ID management table 40". In another example, the determination as to whether the creation of the term-ID management table 38 and the term-ID management table 40 is required during the startup of the information processing terminal 500, may be made based on information regarding the installed/updated term module 20 and term module 22 stored in a nonvolatile memory.

Further, although in the present embodiment, a description is given heretofore of an example in which the term-ID management table 38 and the term-ID management table 40 are created during the startup of the information processing terminal 500, in another example, the creation is made during the startup of the application 10 or in an idle status after the startup of the information processing terminal 500.

<Summary>

According to the present embodiment, in a case where the conditions in which the contents of the term-ID management table 38 and the term-ID management table 40 are likely to change, are satisfied, the term-ID management table 38 and the term-ID management table 40 are created during the startup of the information processing terminal 500. When the conditions in which the contents of the term-ID management table 38 and the term-ID management table 40 are likely to change, are not satisfied, the information processing terminal 500 according to the present embodiment does not create the term-ID management table 38 and the term-ID management table 40 during startup. Thus, the frequency of delay of startup can be reduced.

In a conventional application, a definition is required, for each term to be displayed, between a term ID and a character string of the term to be actually displayed. In a conventional technique of dynamically changing character strings to be displayed on a screen of an application using a term module, it is required to manage terms defined in the term module in association with terms defined in the application, one by one.

For example, in Android (registered trademark), which is an example of an OS, a processing for the above association is performed each time the OS is started up. Thus, the larger the number of applications or the number of terms to be displayed on a screen of the application, the longer it takes to start up the OS.

According to an embodiment of the present disclosure, startup time can be prevented from getting long steadily due to an increase in the number of terms to be displayed on a screen.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An information processing apparatus configured to display first terms each having a corresponding character string embedded in an application, and second terms each having a corresponding character string to be added by a term module for the application, on a screen of the application, the information processing apparatus comprising:
    circuitry configured to
        determine, during startup of the information processing apparatus, whether at least one of the application and the term module has been updated;
        generate, and store in a memory, association information, based on a determination that at least one of the application and the term module has been updated, the association information associating, for a particular term included in the first or second terms, first term identification information identifying a first character string embedded in the application and corresponding to the particular term with second term identification information identifying a second character string embedded in the term module and corresponding to the particular term;
        acquire term identification information being one of the first term identification information of the application and the second term identification information of the term module from the association information stored in the memory; and
        select one of the first and second character strings to be displayed on the screen of the application, using the acquired term identification information.

2. The information processing apparatus of claim 1, wherein the circuitry is further configured to:
    install one of the application and the term module,
    in response to installation of the application, store, in the memory, update information indicating an update of the application; and
    in response to installation of the term module, delete, from the memory, the association information for the term module on which installation has been performed by the circuitry,
    wherein the determination by the circuitry as to whether the application has been updated is made based on the update information stored in the memory, and
    the determination by the circuitry as to whether the term module has been updated is made based on presence or absence of the association information stored in the memory.

3. The information processing apparatus of claim 1, wherein the circuitry is further configured to:
    install one of the application and the term module; and
    store, in the memory, update information indicating an update of one of the application and the term module, on which installation has been performed,
    wherein the determination by the circuitry as to whether at least one of the application and the term module has been updated is made based on the update information stored in the memory.

4. The information processing apparatus of claim 1, wherein
    when determining that the application has been updated, the circuitry is further configured to generate the association information for the term module that has been updated, and
    when determining that the term module has been updated, the circuitry is further configured to generate the association information for the term module that has been updated.

5. The information processing apparatus of claim 1, wherein
    a priority order is assigned to the application and the term module, and
    the circuitry is further configured to acquire one of the first term identification information and the second term identification information from the memory in response to a request for displaying the particular term based on the priority order.

6. The information processing apparatus of claim 5, wherein the circuitry is further configured to determine whether the particular term is present in a first term module having a highest priority in the priority order, and if not, a term in a second term module having a second-highest priority in the priority order is used.

7. The information processing apparatus of claim 6, wherein the circuitry is further configured to determine whether the particular term is present in the second term module, and if not, a term in an application having a third-highest priority in the priority order is used.

8. The information processing apparatus of claim 1, wherein the information processing apparatus is configured to function as an operation unit of an image forming apparatus.

9. The information processing apparatus of claim 1, wherein the circuitry is further configured to generate the association information for at least the particular term, which is included in both the first terms for the application and the second terms for the term module.

10. A non-transitory computer-readable medium storing a plurality of instructions which, when executed by one or more processors, cause the processors to perform a method performed by an information processing apparatus configured to display first terms each having a corresponding character string embedded in an application, and second terms each having a corresponding character string to be added by a term module for the application, on a screen of the application, the method comprising:

determining, during startup of the information processing apparatus, whether at least one of the application and the term module has been updated;

generating and storing in a memory, association information, based on a determination that at least one of the application and the at least one term module has been updated, the association information associating, for a particular term included in the first or second terms, first term identification information identifying a first character string embedded in the application and corresponding to the particular term with second term identification information identifying a second character string embedded in the term module and corresponding to the particular term;

acquiring term identification information being one of the first term identification information of the application and the second term identification information of the term module from the association information stored in the memory; and selecting one of the first and second character strings to be displayed on the screen of the application, using the acquired term identification information.

* * * * *